US012798265B2

(12) United States Patent
Kaneko et al.

(10) Patent No.: US 12,798,265 B2
(45) Date of Patent: Nov. 17, 2026

(54) MEDIUM HEATING APPARATUS AND RECORDING APPARATUS

(71) Applicant: SEIKO EPSON CORPORATION, Tokyo (JP)

(72) Inventors: Kenichiro Kaneko, Okaya (JP); Motofumi Otani, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 109 days.

(21) Appl. No.: 18/675,735

(22) Filed: May 28, 2024

(65) Prior Publication Data

US 2024/0399769 A1 Dec. 5, 2024

(30) Foreign Application Priority Data

May 29, 2023 (JP) ................................ 2023-087582

(51) Int. Cl.
*B41J 11/00* (2006.01)
*B41J 29/02* (2006.01)
*B41J 29/377* (2006.01)

(52) U.S. Cl.
CPC ......... *B41J 11/00222* (2021.01); *B41J 29/02* (2013.01); *B41J 29/377* (2013.01)

(58) Field of Classification Search
None
See application file for complete search history.

(56) References Cited

U.S. PATENT DOCUMENTS 9,770,928 B2 * 9/2017 Harayama ............ B41J 11/0022
2013/0021417 A1 1/2013 Ota
2013/0194367 A1 * 8/2013 Chiwata ............ B41J 11/00222 34/523
2022/0161574 A1 * 5/2022 Mima ................ B41J 11/00218

FOREIGN PATENT DOCUMENTS

JP 2013-022824 A 2/2013

* cited by examiner

*Primary Examiner* — Alejandro Valencia
(74) *Attorney, Agent, or Firm* — WORKMAN NYDEGGER

(57) ABSTRACT

A medium heating apparatus includes a heating unit to heat a medium, a control unit to control the heating unit, a main frame to house the control unit, a sub frame attached to the main frame, and an air blower that blows air to the control unit. The heating unit includes a heat source. The heating unit and the main frame are arranged in a first direction. The main frame and the sub frame are arranged in a second direction. An intake port is open at the main frame, a ventilation port in communication with the intake port and an air drawing port in communication with outside of the sub frame are open at the sub frame. The blower blows air into the main frame through the intake, the ventilation and the air drawing ports. The air drawing port does not overlap the heating unit in the second direction.

8 Claims, 6 Drawing Sheets

MEDIUM HEATING APPARATUS AND RECORDING APPARATUS

The present application is based on, and claims priority from JP Application Serial Number 2023-087582, filed May 29, 2023, the disclosure of which is hereby incorporated by reference herein in its entirety.

BACKGROUND

1. Technical Field

The present disclosure relates to a medium heating apparatus and a recording apparatus.

2. Related Art

JP-A-2013-22824 discloses a medium heating apparatus including a heating unit that heats a medium on which liquid has been ejected, a control unit that controls the heating unit, and a frame a that houses the control unit. An air drawing port through which air is drawn from the outside of the frame is open at the frame. The control unit is cooled by the air drawn from the air drawing port.

In such a medium heating apparatus, the air heated by the heating unit may be drawn from the air drawing port. In this case, the cooling of the control unit may be delayed.

SUMMARY

A medium heating apparatus for solving the above-described problems is configured to heat a medium on which liquid was ejected, the heat medium heating apparatus including a heating unit configured to heat the medium, a control unit configured to control the heating unit, a main frame configured to house the control unit, a sub frame attached to the main frame, and an air blower configured to blow air to the control unit, wherein the heating unit includes a heat source configured to generate heat, and a jetting unit configured to jet air to the medium such that the air flows to a lower side along the medium, the heating unit and the main frame are arranged in a first direction, the main frame and the sub frame are arranged in a second direction different from the first direction, an intake port is open at the main frame, a ventilation port in communication with the intake port and an air drawing port in communication with outside of the sub frame are open at the sub frame, the blower is attached to at least one of the main frame and the sub frame, the blower blows air into the main frame through the intake port, the ventilation port, and the air drawing port, and the air drawing port is located at a position not overlapping the heating unit in the second direction.

A recording apparatus for solving the above-described problems includes a recording unit configured to record an image on a medium by ejecting liquid to the medium, a heating unit configured to heat the medium on which liquid was ejected, a control unit configured to control the heating unit, a main frame configured to house the control unit, a sub frame attached to the main frame, and an air blower configured to blow air to the control unit, wherein the heating unit includes a heat source configured to generate heat, and a jetting unit configured to jet air to the medium such that the air flows to a lower side along the medium, the heating unit and the main frame are arranged in a first direction, the main frame and the sub frame are arranged in a second direction different from the first direction, an intake port is open at the main frame, a ventilation port in communication with the intake port and an air drawing port in communication with outside of the sub frame are open at the sub frame, the blower is attached to at least one of the main frame and the sub frame, the blower blows air into the main frame through the intake port, the ventilation port, and the air drawing port, and the air drawing port is located at a position not overlapping the heating unit in the second direction.

DESCRIPTION OF EMBODIMENTS

An example of a recording apparatus including a medium heating apparatus is described below with reference to the drawings. The recording apparatus is an ink-jet printer that records images such as letters and photographs by ejecting ink, which is an example of liquid, to a medium such as sheets and fabric, for example.

Recording Apparatus

Figure 1:
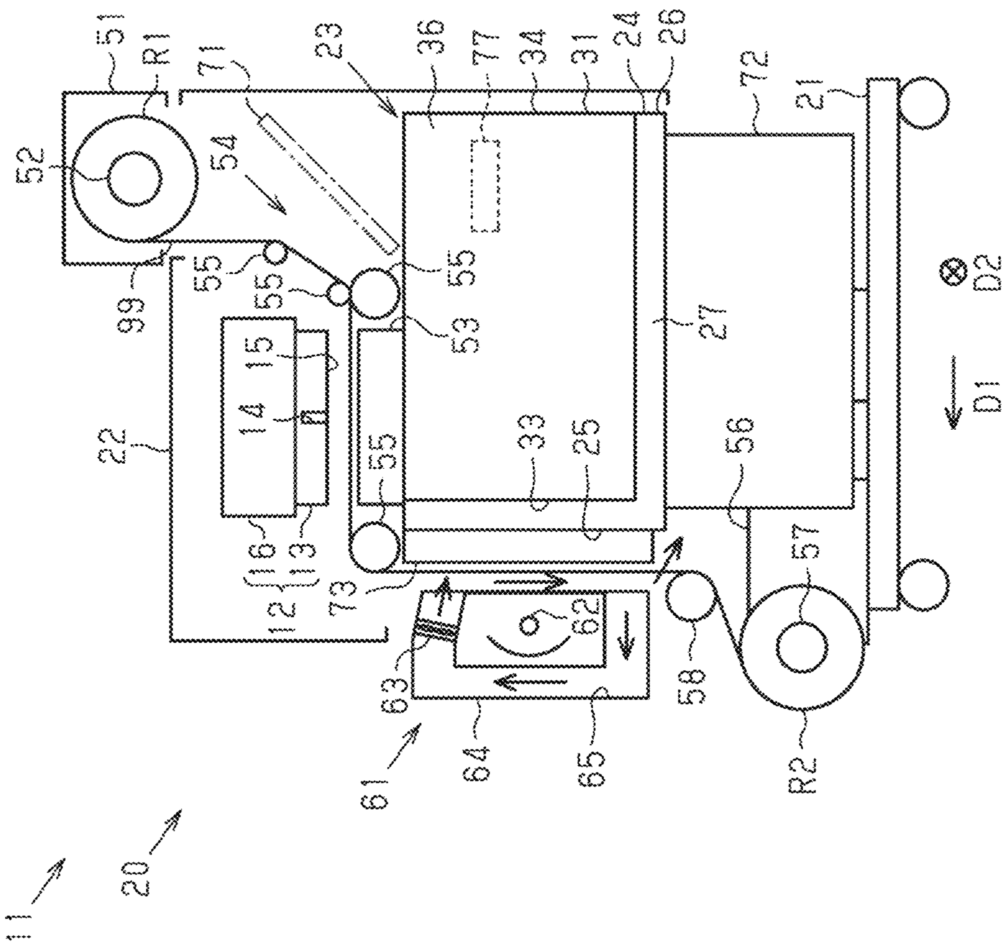
FIG. 1 is a side view illustrating an example of a recording apparatus including a medium heating apparatus.
Figure 2:
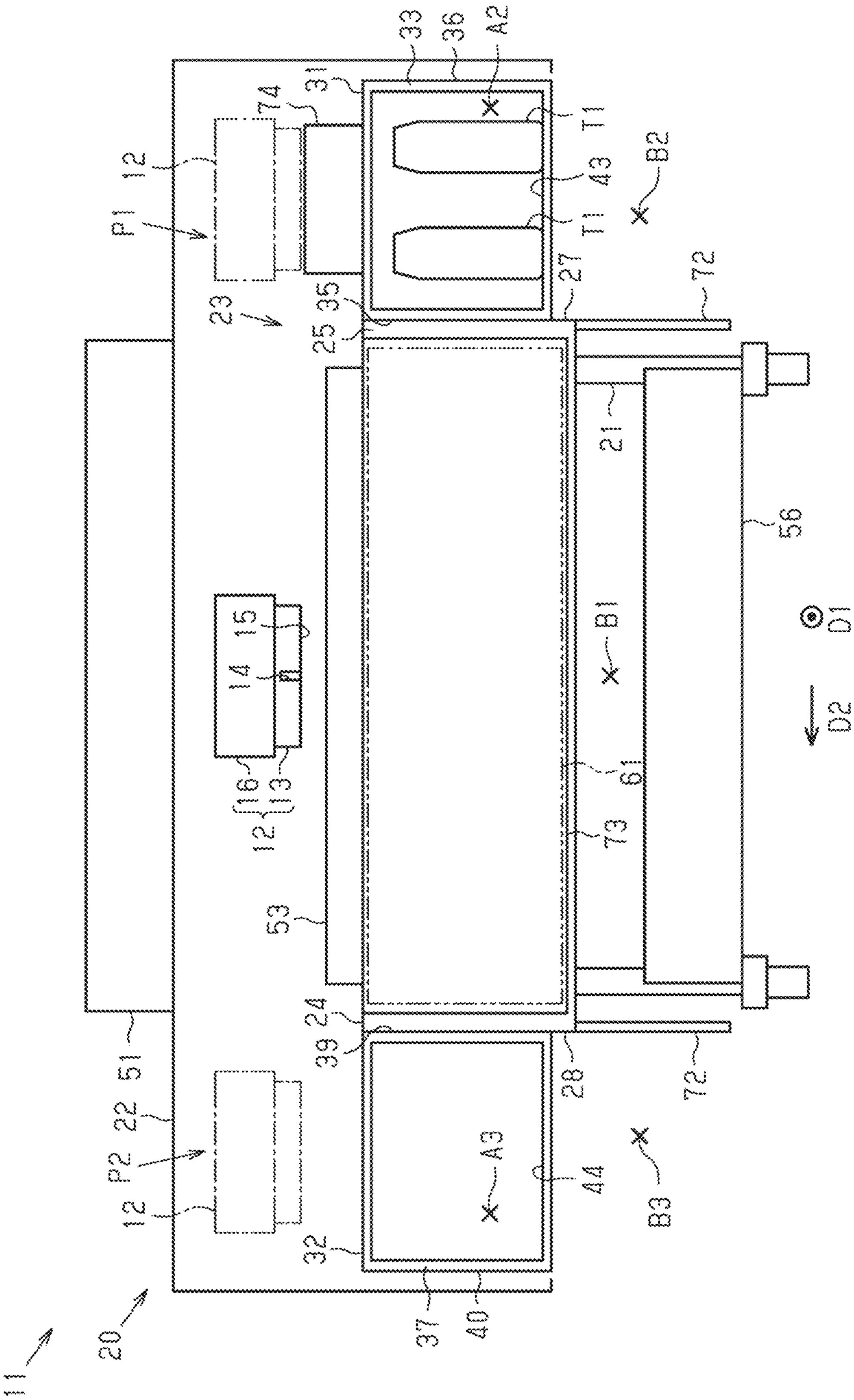
FIG. 2 is a front view of the recording apparatus.

As illustrated in FIGS. 1 and 2, a recording apparatus 11 includes a recording unit 12. The recording unit 12 is configured to record an image on a medium 99. Specifically, the recording unit 12 records an image on the medium 99 by ejecting liquid to the medium 99. The recording unit 12 records an image on the medium 99 conveyed in a first direction D1. The first direction D1 is a direction from the rear side to the front side of the recording apparatus 11.

The recording unit 12 includes a head 13. The head 13 includes a nozzle surface 15 at which one or more nozzles 14 open. The nozzle surface 15 faces the medium 99. The head 13 ejects liquid from the nozzle 14.

The recording unit 12 includes a carriage 16. The carriage 16 is equipped with the head 13. In an example, the carriage 16 performs scanning with respect to the medium 99. Specifically, the carriage 16 moves in a second direction D2 different from the first direction D1. More specifically, the carriage 16 moves back and forth in the second direction D2 and the direction opposite to the second direction D2. In this manner, the head 13 can eject liquid over the width of the medium 99. Thus, the recording apparatus 11 is a serial printer. The recording apparatus 11 may be a line printer that can simultaneously eject liquid over the width of the medium 99.

The recording unit 12 is displaced between a maintenance position P1 and a cleaning position P2 through the back-and-forth movement in the second direction D2 and the direction opposite to the second direction D2. In an example case, the recording unit 12 is displaced from the maintenance position P1 to the cleaning position P2 through the movement in the second direction D2. The two recording units 12 indicated with the single dotted line in FIG. 2 are located at the maintenance position P1 and the cleaning position P2.

At the maintenance position P1, maintenance of the recording unit 12 is performed by a maintenance unit 74 described later. Specifically, the maintenance position P1 is a position where the recording unit 12 is close to the maintenance unit 74. At the cleaning position P2, the recording unit 12 is cleaned by the user, for example. Specifically, the cleaning position P2 is a position where the user can easily access the recording unit 12.

The recording apparatus 11 includes a medium heating apparatus 20. The medium heating apparatus 20 is configured to heat the medium 99 on which the liquid has been ejected. The medium heating apparatus 20 dries the medium 99 by heating the medium 99. When the medium 99 is dried, the image recorded on the medium 99 is fixed. At the medium heating apparatus 20, the vapor of the liquid ejected to the medium 99 is generated from the medium 99 when the medium 99 is heated. The vapor contains water, solvent and the like that make up liquid.

Medium Heating Apparatus

The medium heating apparatus 20 includes a leg part 21. The leg part 21 is in contact with the installation surface where the medium heating apparatus 20 is installed. The medium heating apparatus 20 includes a housing 22. The housing 22 houses the recording unit 12, for example. The medium heating apparatus 20 includes a frame 23. The frame 23 is composed of a sheet metal. The frame 23 is attached to the leg part 21. The frame 23 is located above the leg part 21. The housing 22 is attached to the frame 23. The frame 23 supports various components provided in the medium heating apparatus 20.

Figure 3:
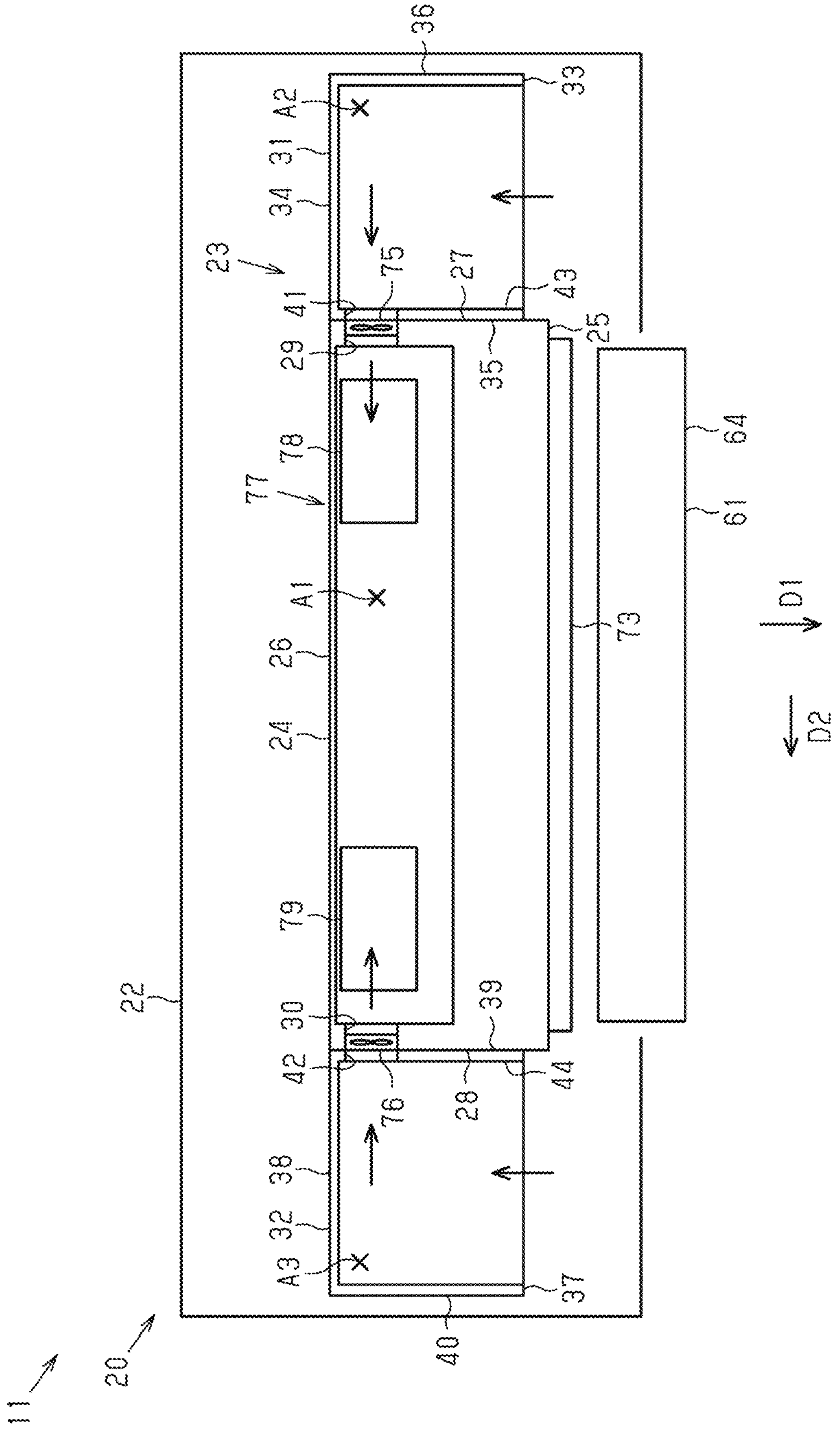
FIG. 3 is a top view of the recording apparatus.

As illustrated in FIGS. 2 and 3, the frame 23 includes a main frame 24. The main frame 24 is a frame that houses a control unit 77 described later. The main frame 24 defines a main space A1. The main space A1 is located at the control unit 77. The main frame 24 is attached to the leg part 21.

The main frame 24 includes a plurality of surfaces. The main frame 24 includes a front surface 25, a rear surface 26, a first side surface 27, and a second side surface 28, for example. The front surface 25 is a surface that faces the front of the medium heating apparatus 20. In an example, the front surface 25 faces the first direction D1. The rear surface 26 is a surface opposite to the front surface 25. The rear surface 26 faces opposite the first direction D1. The first side surface 27 is a surface coupled with the front surface 25 and the rear surface 26. In an example, the first side surface 27 faces opposite the second direction D2. The second side surface 28 is a surface coupled with the front surface 25 and the rear surface 26. The second side surface 28 faces opposite the first side surface 27. The second side surface 28 faces the second direction D2. The main space A1 is defined by the front surface 25, the rear surface 26, the first side surface 27, and the second side surface 28.

One or more intake ports are open at the main frame 24. In an example, two intake ports open at the main frame 24. Specifically, a first intake port 29 and a second intake port 30 are open at the main frame 24. The intake port is open at the side surface in the main frame 24. The two intake ports are open at the first side surface 27 and the second side surface 28. The first intake port 29 is open at the first side surface 27. The second intake port 30 is open at the second side surface 28. The intake port allows the main space A1 to communicate with the outside of the main frame 24. Outside air is introduced into the main space A1 through the intake port. In this manner, outside air is easily introduced into the main space A1 with the two intake ports opening at the main frame 24.

The frame 23 includes one or more sub frames. In an example, the frame 23 includes two sub frames. For example, the frame 23 includes a first sub frame 31 and a second sub frame 32. The sub frame is attached to the main frame 24. The sub frame is arranged with the main frame 24 in the second direction D2. Specifically, the first sub frame 31, the main frame 24, and the second sub frame 32 are arranged in this order in the second direction D2. The first sub frame 31 and the second sub frame 32 sandwich the main frame 24 in the second direction D2.

The first sub frame 31 is attached to the main frame 24. In an example, the first sub frame 31 is attached to the first side surface 27. The first sub frame 31 is a frame that ensures the maintenance position P1, for example. The position on the upper side of the first sub frame 31 is the maintenance position P1. The first sub frame 31 supports the maintenance unit 74.

The first sub frame 31 defines a first sub space A2. A waste liquid tank Ti coupled with the maintenance unit 74 is located in the first sub space A2. The waste liquid tank Ti stores liquid received by the maintenance unit 74. The waste liquid tank Ti is replaceable for the first sub frame 31.

The first sub frame 31 includes a plurality of surfaces. The first sub frame 31 includes a first front surface 33, a first rear surface 34, a first opposite side surface 35, and a first non-opposite side surface 36, for example. The first front surface 33 is a surface that faces the front of the medium heating apparatus 20. In an example, the first front surface 33 faces the first direction D1. The first rear surface 34 is a surface that faces opposite the first front surface 33. The first rear surface 34 faces opposite the first direction D1. The first opposite side surface 35 is a side surface coupled with the first front surface 33 and the first rear surface 34. The first opposite side surface 35 faces the main frame 24. Specifically, the first opposite side surface 35 faces the first side surface 27. The first opposite side surface 35 makes contact with the first side surface 27. In an example, the first opposite side surface 35 faces the second direction D2. The first non-opposite side surface 36 is a side surface coupled with the first front surface 33 and the first rear surface 34. The first non-opposite side surface 36 faces opposite the first opposite side surface 35. The first non-opposite side surface 36 does not face the main frame 24. The first non-opposite side surface 36 faces opposite the second direction D2. The first sub space A2 is defined by the first front surface 33, the first rear surface 34, the first opposite side surface 35, and the first non-opposite side surface 36.

The second sub frame 32 is attached to the main frame 24. In an example, the second sub frame 32 is attached to the second side surface 28. The second sub frame 32 is a frame that ensures the cleaning position P2, for example. The position on the upper side of the second sub frame 32 is the cleaning position P2. The second sub frame 32 defines a second sub space A3.

The second sub frame 32 includes a plurality of surfaces. The second sub frame 32 includes a second front surface 37, a second rear surface 38, a second opposite side surface 39, and a second non-opposite side surface 40, for example. The second front surface 37 is a surface that faces the front of the medium heating apparatus 20. In an example, the second front surface 37 faces the first direction D1. The second rear surface 38 is a surface that faces opposite the second front surface 37. The second rear surface 38 faces opposite the first direction D1. The second opposite side surface 39 is a side surface coupled with the second front surface 37 and the second rear surface 38. The second opposite side surface 39 faces the main frame 24. Specifically, the second opposite side surface 39 faces the second side surface 28. The second opposite side surface 39 makes contact with the second side surface 28. In an example, the second opposite side surface 39 faces the opposite direction of the second direction D2.

The second non-opposite side surface 40 is a side surface coupled with the second front surface 37 and the second rear surface 38. The second non-opposite side surface 40 faces opposite the second opposite side surface 39. The second non-opposite side surface 40 does not face the main frame 24. The second non-opposite side surface 40 faces the second direction D2. The second sub space A3 is defined by the second front surface 37, the second rear surface 38, the second opposite side surface 39, and the second non-opposite side surface 40.

A ventilation port is open at each of the first sub frame 31 and the second sub frame 32. The ventilation port is an opening in communication with the intake port. A first ventilation port 41 is open at the first sub frame 31. A second ventilation port 42 is open at the second sub frame 32. The first ventilation port 41 is in communication with the first intake port 29. The second ventilation port 42 is in communication with the second intake port 30. The first ventilation port 41 is open at the first opposite side surface 35. The second ventilation port 42 is open at the second opposite side surface 39. The first sub space A2 is in communication with the main space A1 through the first ventilation port 41 and the first intake port 29. The second sub space A3 is in communication with the main space A1 through the second ventilation port 42 and the second intake port 30.

An air drawing port is open at each of the first sub frame 31 and the second sub frame 32. A first air drawing port 43 is open at the first sub frame 31. A second air drawing port 44 is open at the second sub frame 32. The air drawing port is an opening in communication with the outside of the sub frame. The inside of the sub frame is in communication with the outside of the sub frame through the air drawing port. Outside air is drawn into the sub frame through the air drawing port. Specifically, the air inside the housing 22 is drawn into the sub frame through the air drawing port. Specifically, the air located around the sub frame is drawn into the sub frame through the air drawing port. Outside air is introduced into the housing 22 through the gap between the housing 22 and the frame 23. In this manner, outside air is introduced into the sub frame through the air drawing port.

The first air drawing port 43 is open at the first front surface 33, for example. The second air drawing port 44 is open at the second front surface 37, for example. The air drawing port may be open at another surface. The first air drawing port 43 is in communication with the first sub space A2. The second air drawing port 44 is in communication with the second sub space A3. Outside air is introduced into the main space A1 through the intake port, the ventilation port, and the air drawing port.

As illustrated in FIG. 1, the medium heating apparatus 20 may include a feeding unit 51. The feeding unit 51 is configured to feed the medium 99. Specifically, the feeding unit 51 feeds the medium 99 before the recording. The feeding unit 51 is attached to the frame 23. The feeding unit 51 is attached to the main frame 24, for example. The feeding unit 51 includes a feeding shaft 52. The feeding shaft 52 rotatably supports a roll R1 composed of the wound medium 99. As the feeding shaft 52 rotates, the medium 99 is fed from the roll R1. Thus, in an example, the medium heating apparatus 20 heats the medium 99 fed from the feeding unit 51. The medium heating apparatus 20 may heat the medium 99 fed from another apparatus.

The medium heating apparatus 20 includes a supporting unit 53. The supporting unit 53 supports the medium 99. The supporting unit 53 faces the nozzle surface 15. Thus, the supporting unit 53 supports the medium 99 subjected to the recording of the recording unit 12. Specifically, the supporting unit 53 supports a portion of the medium 99 subjected to the recording of the recording unit 12. The supporting unit 53 is attached to the main frame 24, for example. The supporting unit 53 is located on the upper side of the main frame 24.

The medium heating apparatus 20 includes a conveyance unit 54. The conveyance unit 54 is configured to convey the medium 99. The conveyance unit 54 conveys the medium 99 fed from the feeding unit 51. The conveyance unit 54 conveys in the first direction D1 the medium 99 located on the supporting unit 53. The conveyance unit 54 conveys downward the medium 99 recorded by the recording unit 12. Specifically, the conveyance unit 54 conveys the medium 99 such that the medium 99 passes through the upper side of the main frame 24 and the front side of the main frame 24. The conveyance unit 54 includes one or more rollers 45. The roller 45 makes contact with the medium 99. As the roller 45 rotates, the medium 99 is conveyed.

The medium heating apparatus 20 includes a winding unit 56. The winding unit 56 is configured to wind the medium 99. Specifically, the winding unit 56 winds the recorded medium 99. More specifically, the winding unit 56 winds the medium 99 heated by a heating unit 61 described later. The winding unit 56 is attached to the leg part 21, for example. The winding unit 56 includes a winding shaft 57. The winding shaft 57 rotatably supports a roll R2 composed of the wound medium 99. As the winding shaft 57 rotates, the medium 99 is wound around the roll R2.

The medium heating apparatus 20 includes a guide bar 58. The guide bar 58 is configured to guide the medium 99 to the winding unit 56. The medium 99 is wound around the guide bar 58. Specifically, the medium 99 heated by heating unit 61 is wound around the guide bar 58. Thus, the guide bar 58 makes contact with a portion of the medium 99 that has been heated by heating unit 61 but is before wound around the winding unit 56. The guide bar 58 guides the medium 99 to the lower side. In an example, the guide bar 58 is located immediately below heating unit 61.

The medium heating apparatus 20 includes the heating unit 61. The heating unit 61 is configured to heat the medium 99. The heating unit 61 heats the medium 99 conveyed by the conveyance unit 54. Specifically, the heating unit 61 heats a portion of the medium 99 that has been subjected to recording of the recording unit 12 but is before wound by the winding unit 56.

The heating unit 61 is attached to the main frame 24. The heating unit 61 is located on the front side of the main frame 24. Specifically, the heating unit 61 faces the front surface 25. The heating unit 61 heats the medium 99 that passes between the heating unit 61 and the main frame 24. Specifically, in an example, the heating unit 61 heats a portion of the medium 99 that is conveyed downward.

The heating unit 61 overlaps the housing 22 as viewed in the vertical direction. In an example, a part of the heating unit 61 overlaps the housing 22 as viewed in the vertical direction. In this manner, in comparison with the case where the heating unit 61 does not overlap the housing 22 as viewed in the vertical direction, the protruding amount of the heating unit 61 protruding forward from the housing 22 is reduced. In this manner, the footprint of the medium heating apparatus 20 is reduced. Normally, the user operates the medium heating apparatus 20 from the front side of the medium heating apparatus 20. Therefore, the reduction of the protruding amount of the heating unit 61 with respect to the housing 22 makes the user operation of the medium heating apparatus 20 easier. Note that, in FIG. 1, as viewed from the vertical direction, a part of the heating unit 61 overlaps the housing 22, but the entirety of the heating unit 61 may overlap the housing 22. In this case, the protruding amount of the heating unit 61 protruding forward from the housing 22 is further reduced, and thus the above-described effect can be further increased.

The heating unit 61 includes a heat source 62. The heat source 62 is configured to generate heat. The heat source 62 faces the surface of the medium 99 on which liquid has been ejected. Thus, the heat source 62 heats the surface of the medium 99 on which liquid has been ejected. In an example, the heat source 62 heats the medium 99 by means of radiant heat. The heat source 62 is an infrared ray heater, for example. The heat source 62 emits an infrared ray toward the medium 99. As the heat source 62 heats the medium 99, the medium 99 is dried.

The heating unit 61 includes a jetting unit 63. The jetting unit 63 is a fan, for example. The jetting unit 63 is configured to jet air to the medium 99. Specifically, the jetting unit 63 jets air to the surface of the medium 99 on which liquid has been ejected. More specifically, the jetting unit 63 jets air such that the air flows downward along the medium 99. Thus, the air jetted to the medium 99 flows downward along the surface of the medium 99 on which liquid has been ejected. In this manner, the vapor on the medium 99 flows downward, thus facilitating the drying of the medium 99. In addition, the risk of occurrence of the situation where the air heated by the heating unit 61, the vapor generated from the medium 99 or the like flows to the upper side, i.e., to the inside of the housing 22 is reduced. That is, the risk of high temperature in the housing 22 or high humidity in the housing 22 is reduced. Thus, the risk of deterioration in recording quality is reduced.

The heating unit 61 includes a case 64. The case 64 houses the heat source 62 and the jetting unit 63. The case 64 opens toward the medium 99. Specifically, the case 64 opens toward the front surface 25.

In the case 64, a circulation channel 65 may be formed. The circulation channel 65 is a channel for circulating the air heated by the heat source 62. The circulation channel 65 extends to surround the heat source 62. The jetting unit 63 is located in the circulation channel 65. In the heating unit 61, the air jetted by the jetting unit 63 circulates by flowing over the medium 99 and through the circulation channel 65. More specifically, the air circulates as indicated with the arrow in FIG. 1. In this manner, the heating efficiency of the medium 99 is improved.

In the heating unit 61, when the jetting unit 63 jets air to the medium 99, air with high temperature may flow into the lower side of the main frame 24 together with vapor in some situation. Specifically, in some situation a part of the air jetted by the jetting unit 63 to the medium 99 may flow into the lower side of the main frame 24 through the medium 99. In addition, since air tends to rise at higher temperatures, the air with high temperature having flown into the lower side of the main frame 24 tends to flow into the upper side of the main frame 24. Specifically, the air with high temperature having flown into the lower side of the main frame 24 eventually circulates around the main frame 24. As a result, in the medium heating apparatus 20, the region around the main frame 24 tends to have high temperature. The atmospheres on the front side, rear side, upper side, and lower side of the main frame 24 especially tend to have high temperature.

As illustrated in FIG. 3, the heating unit 61 is located at a position not overlapping the air drawing port in the second direction D2. That is, the heating unit 61 does not overlap the first air drawing port 43 in the second direction D2. The heating unit 61 does not overlap the second air drawing port 44 in the second direction D2. Thus, the air around the main frame 24 with high temperature due to the heating unit 61 less extends to the air drawing port.

The heating unit 61 is located at a position not overlapping the sub frame in the second direction D2. That is, the heating unit 61 does not overlap the first sub frame 31 in the second direction D2. The heating unit 61 does not overlap the second sub frame 32 in the second direction D2. Thus, the air around the main frame 24 with high temperature due to the heating unit 61 less extends to the region around the sub frame.

As illustrated in FIG. 1, the medium heating apparatus 20 may include a partition member 71. The partition member 71 is a member that partitions the inner space of the housing 22. Specifically, the partition member 71 is located between the recording unit 12 and the control unit 77 in the housing 22. In this manner, the partition member 71 partitions the region into the region where the recording unit 12 is located and the region where the control unit 77 is located. The partition member 71 is located on the rear side of the recording unit 12 in the housing 22, for example. In the housing 22, mist of the liquid ejected from the recording unit 12 may float in some situation. In view of this, partitioning with the partition member 71 reduces the risk of the mist extending to the control unit 77.

As illustrated in FIG. 2, the medium heating apparatus 20 may include one or more partition members 72. In an example, the medium heating apparatus 20 includes two partition members 72. The partition member 72 is a member that partitions the region into the region located on the lower side of the main frame 24, and the region located on the lower side of the sub frame. Specifically, the partition member 72 partitions the region into a main region B1 and a sub region. More specifically, the partition member 72 partitions the region into the main region B1 and the sub region as viewed from the first direction D1. In other words, the partition member 72 partitions the region into the main region B1 and the sub region in the second direction D2. One of the two partition members 72 partitions the region into the main region B1 and a first sub region B2, and the other partitions the region into the main region B1 and a second sub region B3. The main region B1 is the region located on the lower side of the main frame 24. The first sub region B2 is the region located on the lower side of the first sub frame 31. The second sub region B3 is the region located on the lower side of the second sub frame 32.

The partition member 72 is attached to the main frame 24, for example. The partition member 72 may be attached to the sub frame. The partition member 72 extends downward from the main frame 24. The partition member 72 reduces the risk of occurrence of the situation where the air with high temperature having flown into the lower side of the main frame 24 flows into the region around the sub frame. Thus, the partition member 72 reduces the risk of occurrence of the situation where the region around the sub frame has high temperature or high humidity.

The medium heating apparatus 20 may include a heat shielding member 73. The heat shielding member 73 is configured to shield the heat of the heating unit 61. Specifically, the heat shielding member 73 shields the heat applied from the heating unit 61 to the main frame 24. The heat shielding member 73 is located between the heating unit 61 and the main frame 24. The heat shielding member 73 is attached to the main frame 24. The heat shielding member 73 is located along the front surface 25. The heat shielding member 73 faces the heating unit 61. The medium 99 passes through the heat shielding member 73 and the heating unit 61. The heat shielding member 73 reduces the risk of occurrence of the situation where the main space A1 has high temperature.

The medium heating apparatus 20 may include the maintenance unit 74. The maintenance unit 74 performs maintenance of the recording unit 12 located at the maintenance position P1. In an example, the maintenance unit 74 performs maintenance of the recording unit 12 by receiving liquid of flushing, cleaning and the like from the recording unit 12. The flushing is an operation of appropriately ejecting the liquid from the nozzle 14. The flushing reduces the risk of clogging of the nozzle 14. The cleaning is an operation of ejecting the liquid from the nozzle 14. The cleaning ejects foreign matters together with the liquid from the nozzle 14. The maintenance unit 74 ejects the liquid from the nozzle 14 by suctioning it in the state where it is in contact with the head 13. The liquid received by the maintenance unit 74 flows to the waste liquid tank Ti.

As illustrated in FIG. 3, the medium heating apparatus 20 includes one or more blowers. In an example, the medium heating apparatus 20 includes a first blower 75 and a second blower 76. The blower is a fan, for example. The blower is configured to blow air to the main space A1. The blower blows air to the control unit 77. The blower cools the control unit 77 by blowing air.

The blower is attached to at least one of the main frame 24 and the sub frame. Specifically, the blower is attached to the main frame 24, the sub frame, or both. In an example, the first blower 75 is attached to the main frame 24. The first blower 75 is located at the first intake port 29. The second blower 76 is attached to the main frame 24. The second blower 76 is located at the second intake port 30.

The blower blows air into the main frame 24 through the intake port, ventilation port, and air drawing port. Specifically, the blower blows air from the sub space to the main space A1. Specifically, the first blower 75 blows air from the first sub space A2 to the main space A1. The second blower 76 blows air from the second sub space A3 to the main space A1. When the first blower 75 is driven, air flows from the region around the first sub frame 31 to the main space A1 through the first air drawing port 43, the first ventilation port 41, and the first intake port 29. When the second blower 76 is driven, air flows from the region around the second sub frame 32 to the main space A1 through the second air drawing port 44, the second ventilation port 42, and the second intake port 30.

Since air is drawn to the main frame 24 from the region around the sub frame, air with relatively low temperature flows into the main frame 24. If air is drawn to the main frame 24 from the region around the main frame 24, air with relatively high temperature flows into the main frame 24. The reason for this is that the air heated by the heating unit 61 extends to the region around the main frame 24. The air is drawn to the main frame 24 as indicated by the arrow in FIG. 3.

The medium heating apparatus 20 includes the control unit 77. The control unit 77 controls the heating unit 61 and the blower. Specifically, the control unit 77 controls the heating unit 61, the first blower 75, and the second blower 76. The control unit 77 may control the feeding unit 51, the conveyance unit 54, the winding unit 56, the maintenance unit 74 and the like. The control unit 77 may further control the recording unit 12.

The control unit 77 may be composed of one or more processors that execute various processes in accordance with a computer program. The control unit 77 may be composed of one or more dedicated hardware circuits such as an application-specific integrated circuit that executes at least some of various processes. The control unit 77 may be composed of a circuit including a combination of a processor and a hardware circuit. The processor includes a CPU, and a memory such as a RAM and a ROM. The memory stores program codes or commands configured to cause the CPU to execute processes. The memory, i.e., a computer readable medium, includes any type of readable mediums that are accessible by general-purpose or dedicated computers.

The control unit 77 is attached to the main frame 24. The control unit 77 is located in the main space A1. The control unit 77 includes one or more substrates. In an example, the control unit 77 includes a first substrate 78 and a second substrate 79. The first substrate 78 and the second substrate 79 are power substrates, control substrates or the like. The first substrate 78 and the second substrate 79 are arranged in this order in the second direction D2 in the main space A1.

The first substrate 78 and the second substrate 79 generate heat through energization. As such, the first substrate 78 and the second substrate 79 need to be cooled. That is, the main space A1 needs to be cooled.

The first substrate 78 receives the air blown by the first blower 75. The second substrate 79 receives the air blown by the second blower 76. In this manner, the first substrate 78 and the second substrate 79 are cooled by the blower. Specifically, the first substrate 78 is cooled by the air blow of the first blower 75. The second substrate 79 is cooled by the air blow of the second blower 76. As such, in the medium heating apparatus 20, it is important that the blower blows air with low temperature into the main frame 24. In view of this, since the air drawing port is open at the sub frame, the air around the sub frame can be supplied to the control unit 77. Specifically, the first substrate 78 is cooled by the air around the first sub frame 31. Specifically, the second substrate 79 is cooled by the air around the second sub frame 32. The air around sub frame effectively cools the control unit 77.

Operations and Effects

Next, operations and effects of the above-mentioned examples are described.

(1) The first air drawing port 43 and the second air drawing port 44 are located at positions not overlapping the heating unit 61 in the second direction D2.

The air heated by the heating unit 61 flows downward along the medium 99, and then moves upward. As such, the air heated by the heating unit 61 is likely to extend to the main frame 24. For this reason, if the air is directly drawn into the main frame 24 from the outside of the main frame 24, the heated air is likely to extend to the main frame 24. In view of this, in the above-mentioned configuration, the air is drawn to the main frame 24 from the first sub frame 31 and the second sub frame 32. Since the air drawing port does not overlap the heating unit 61 in the second direction D2, the heated air less enters the sub frame from the air drawing port. That is, the blower can blow the air that is not heated by the heating unit 61 to the control unit 77. Thus, the control unit 77 is effectively cooled.

(2) The first sub frame 31 and the second sub frame 32 do not overlap the heating unit 61 in the second direction D2.

With the above-mentioned configuration, the heated air less enters the sub frame from the air drawing port.

(3) The first blower 75 is located at the first intake port 29, and the second blower 76 is located at the second intake port 30.

With the above-mentioned configuration, the blower can blow air to the control unit 77 with a large air volume.

(4) The heating unit 61 is located on the front side of the main frame 24. The first air drawing port 43 is open at the first front surface 33, and the second air drawing port 44 is open at the second front surface 37.

The user operates the medium heating apparatus 20 from the front side of the medium heating apparatus 20. Thus, the space for the user is ensured on the front side of the medium heating apparatus 20. That is, with the above-mentioned configuration, the space is easily ensured on the front side of the sub frame, and outside air can be easily taken from the front surface of the sub frame.

(5) The medium heating apparatus 20 includes the partition member 72 that partitions the region into the main region B1 and the sub region as viewed from the first direction D1.

The air heated by the heating unit 61 flows downward along the medium 99, and then passes through the main region B1. Thus, with the above-mentioned configuration, the partition member 72 reduces the risk of occurrence the situation where the air passing through the main region B1 flows into the first sub region B2 and the second sub region B3. This reduces the risk of occurrence of the situation where the air heated by the heating unit 61 is drawn from the air drawing port.

Modifications

The above-mentioned examples may be modified as follows for implementation. The above-mentioned examples and the following modifications may be combined for implementation insofar as they are not technically inconsistent.

Figure 4:
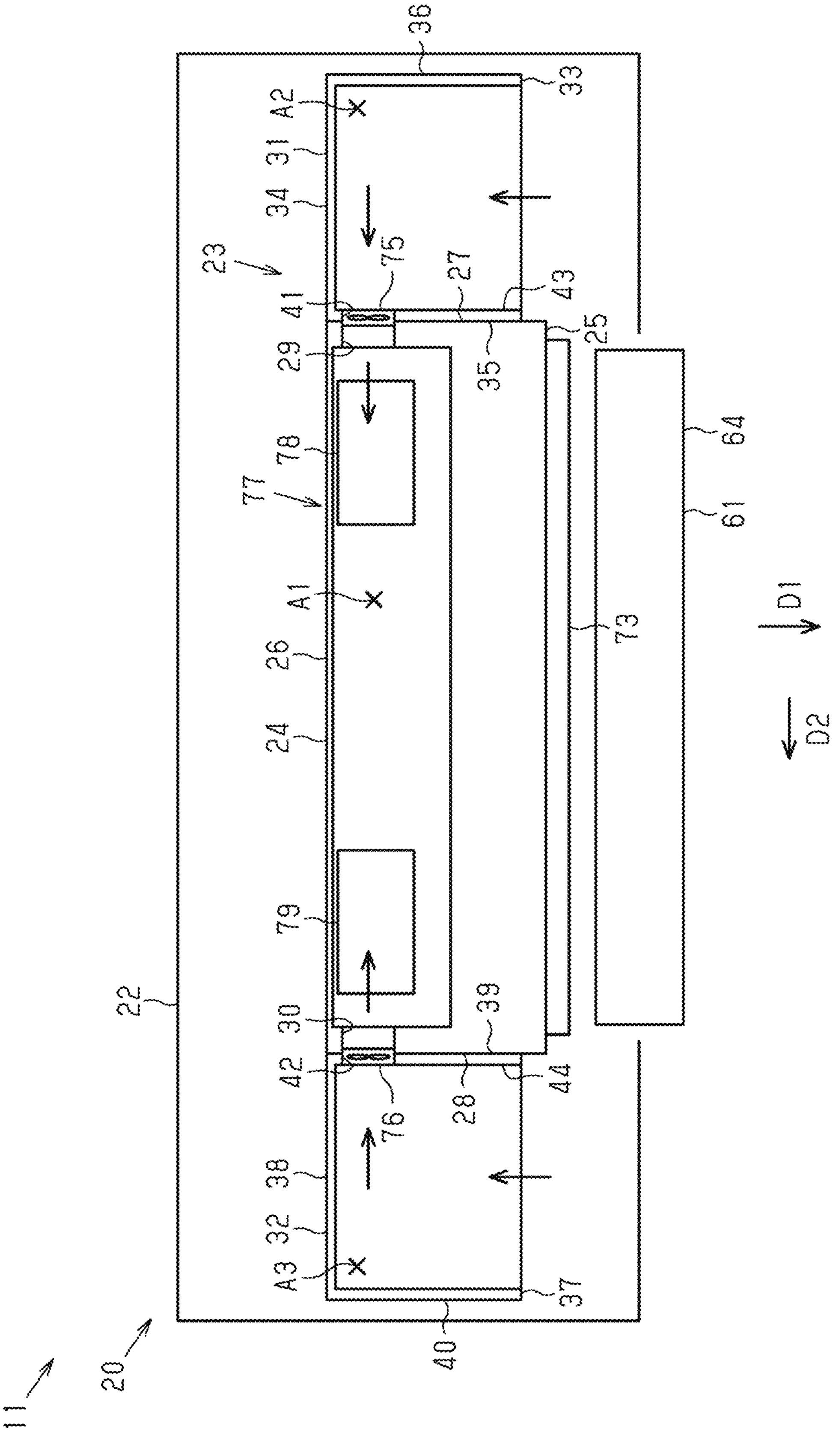
FIG. 4 is a top view illustrating a modification of the recording apparatus.

As illustrated in FIG. 4, the blower may be attached to the sub frame. Specifically, the first blower 75 may be attached to the first sub frame 31. The second blower 76 may be attached to the second sub frame 32. In this modification, the first blower 75 is located at the first ventilation port 41. The second blower 76 is located at the second ventilation port 42. In addition, the first blower 75 may be attached to both of the main frame 24 and the first sub frame 31. The second blower 76 may be attached to both of the main frame 24 and the second sub frame 32. The first blower 75 may be located at the first air drawing port 43. The second blower 76 may be located at the second air drawing port 44.

Figure 5:
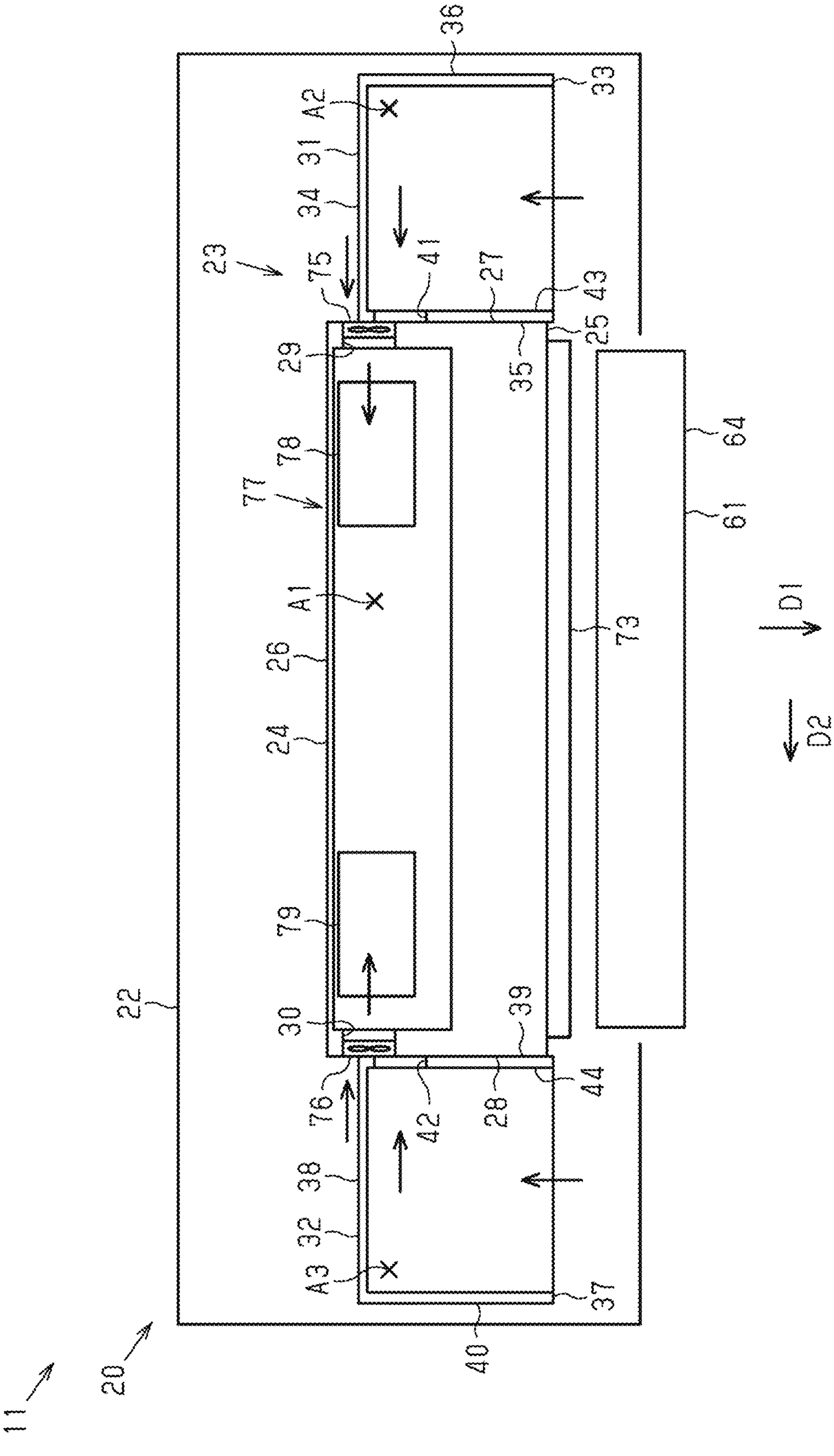
FIG. 5 is a top view illustrating a modification different from FIG. 4.

As illustrated in FIG. 5, the intake port may communicate the inside of the sub frame and the region around the sub frame with the inside of the main frame 24. Specifically, the first intake port 29 may communicate the first sub space A2 and the space on the rear side of the first sub frame 31 with the main space A1. The second intake port 30 may communicate the second sub space A3 and the space on the rear side of the second sub frame 32 with the main space A1. In this case, the air can be taken into the main frame 24 from the front and rear sides of the sub frame.

Figure 6:
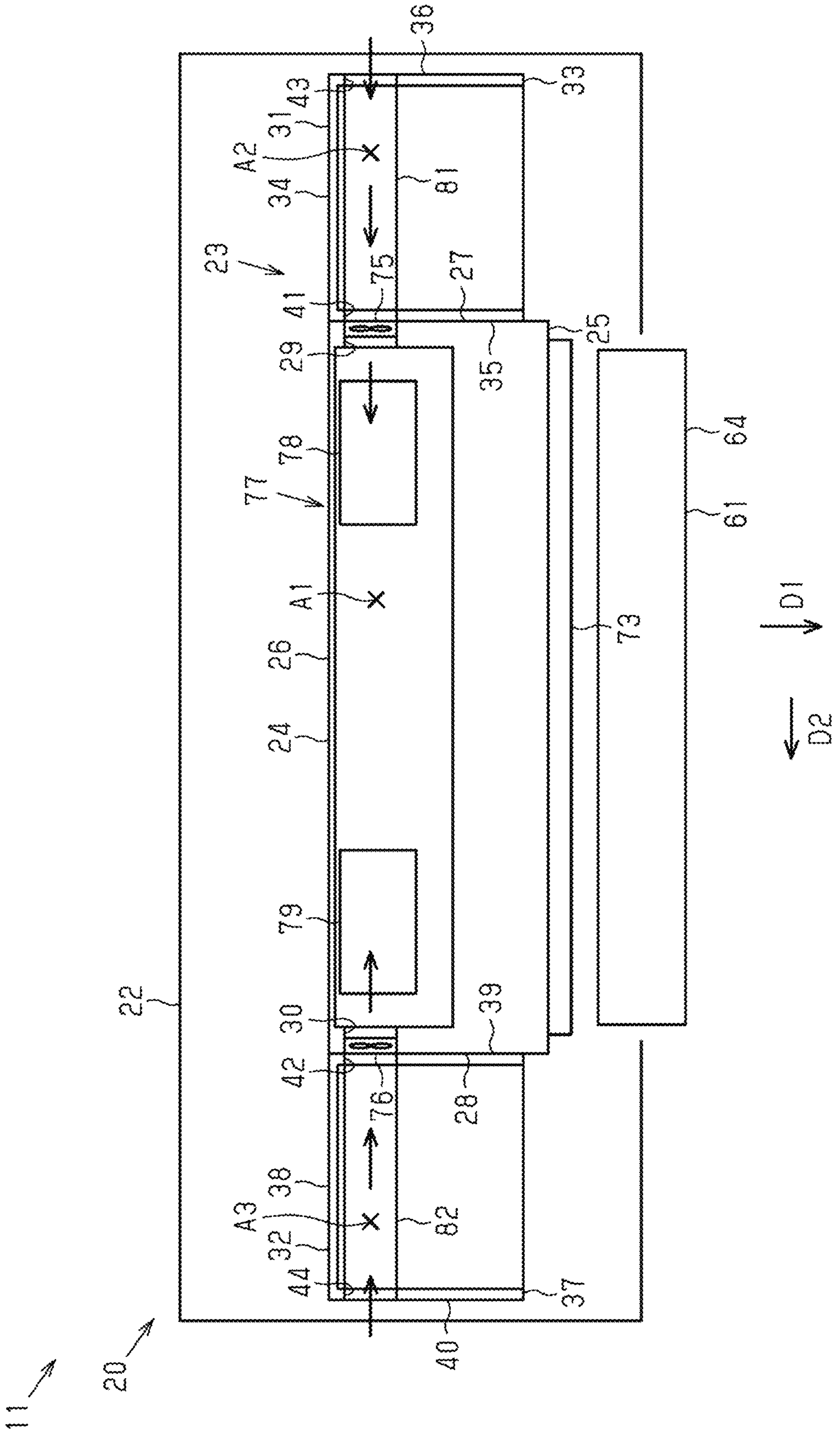
FIG. 6 is a top view illustrating a modification different from FIGS. 4 and 5.

As illustrated in FIG. 6, the sub frame may include a duct. Specifically, the first sub frame 31 may include a first duct 81. The second sub frame 32 may include a second duct 82. The duct is a tube in communication with the ventilation port and the air drawing port. In this manner, the first duct 81 is in communication with the first ventilation port 41 and the first air drawing port 43. The second duct 82 is in communication with the second ventilation port 42 and the second air drawing port 44. The inside of the first duct 81 is the first sub space A2. The inside of the second duct 82 is the second sub space A3. With the duct, the air is easily drawn into the main frame 24. In this modification, the first air drawing port 43 is open at the first non-opposite side surface 36. The second air drawing port 44 is open at the second non-opposite side surface 40.

In the housing 22, an opening may be formed at a portion corresponding to the air drawing port. In this manner, the air is easily drawn from the air drawing port.

The liquid ejected by the recording unit 12 is not limited to ink, but may be liquid in which particles of functional materials are dispersed or mixed, or the like, for example. For example, the recording unit 12 may eject liquid containing materials such as electrode materials or pixel materials dispersed or dissolved therein for use in manufacture of liquid crystal displays, electroluminescence displays, surface-emitting displays, and the like.

Technical Ideas

The following describes technical ideas and operational effects that are derived from the above-described examples and modifications.

(A) A medium heating apparatus is configured to heat a medium on which liquid was ejected, the heat medium heating apparatus including a heating unit configured to heat the medium, a control unit configured to control the heating unit, a main frame configured to house the control unit, a sub frame attached to the main frame, and an air blower configured to blow air to the control unit, wherein the heating unit includes a heat source configured to generate heat, and a jetting unit configured to jet air to the medium such that the air flows to a lower side along the medium, the heating unit and the main frame are arranged in a first direction, the main frame and the sub frame are arranged in a second direction different from the first direction, an intake port is open at the main frame, a ventilation port in communication with the intake port and an air drawing port in communication with outside of the sub frame are open at the sub frame, the blower is attached to at least one of the main frame and the sub frame, the blower blows air into the main frame through the intake port, the ventilation port, and the air drawing port, and the air drawing port is located at a position not overlapping the heating unit in the second direction.

The air heated by the heating unit flows downward along the medium, and then moves upward. As such, the air heated by the heating unit is likely to extend to the main frame. As a result, if the air is directly drawn into the main frame from the outside of the main frame, the heated air is likely to extend into the main frame. In view of this, with the above-mentioned configuration, the air is drawn from the sub frame into the main frame. Since the air drawing port does not overlap the heating unit in the second direction, the heated air less enters the sub frame from the air drawing port. That is, the blower can blow, to the control unit, air that is not heated by the heating unit. Thus, the control unit is effectively cooled.

(B) In the above-described medium heating apparatus, the sub frame may not overlap the heating unit in the second direction.

With the above-mentioned configuration, the heated air less enters the sub frame from the air drawing port.

(C) In the above-described medium heating apparatus, the blower may not be located at the intake port. With the above-mentioned configuration, the blower can blow air to the control unit with a large air volume.

(D) In the above-described medium heating apparatus, the heating unit may be located on a front side of the main frame, and the air drawing port may be open at a front surface of the sub frame. The user operates the medium heating apparatus from the front side of the medium heating apparatus. Thus, the space for the user is ensured on the front side of medium heating apparatus. That is, with the above-mentioned configuration, the space is easily ensured on the front side of the sub frame, and outside air can be easily taken from the front surface of the sub frame.

(E) In the above-described medium heating apparatus, the sub frame may include a duct in communication with the ventilation port and the air drawing port.

With the above-mentioned configuration, the air is easily drawn into the main frame through the sub frame.

(F) In the above-described medium heating apparatus, the above-described medium heating apparatus may further include a partition member configured to partition a region into a region located on a lower side of the main frame and a region located on a lower side of the sub frame as viewed from the first direction.

The air heated by the heating unit flows downward along the medium, and then passes through the region on the lower side of the main frame. Thus, with the above-mentioned configuration, the partition member reduces the risk of occurrence of the situation where the air passing through the region located on the lower side of the main frame enters the region located on the lower side of the sub frame. This reduces the risk of occurrence of the situation where the air heated by the heating unit is drawn from the air drawing port.

(G) A recording apparatus includes a recording unit configured to record an image on a medium by ejecting liquid to the medium, a heating unit configured to heat the medium on which liquid was ejected, a control unit configured to control the heating unit, a main frame configured to house the control unit, a sub frame attached to the main frame, and an air blower configured to blow air to the control unit, wherein the heating unit includes a heat source configured to generate heat, and a jetting unit configured to jet air to the medium such that the air flows to a lower side along the medium, the heating unit and the main frame are arranged in a first direction, the main frame and the sub frame are arranged in a second direction different from the first direction, an intake port is open at the main frame, a ventilation port in communication with the intake port and an air drawing port in communication with outside of the sub frame are open at the sub frame, the blower is attached to at least one of the main frame and the sub frame, the blower blows air into the main frame through the intake port, the ventilation port, and the air drawing port, and the air drawing port is located at a position not overlapping the heating unit in the second direction. The above-mentioned configuration can achieve the same effects as those of the above-described medium heating apparatus.

What is claimed is:

1. A medium heating apparatus configured to heat a medium on which liquid was ejected, the heat medium heating apparatus comprising:
- a conveyance unit configured to convey the medium in a gravity direction;
- a heating unit configured to heat the medium conveyed in the gravity direction by the conveyance unit;
- a control unit configured to control the heating unit;
- a main frame configured to house the control unit;
- a sub frame attached to the main frame; and
- an air blower configured to blow air to the control unit, wherein
- the heating unit includes:
- a heat source configured to generate heat,
- a jetting unit configured to jet air to the medium such that the air flows downward in the gravity direction along the medium, and
- a case configured to house the heat source and the jetting unit, the case being provided as a separate body from the main frame,
- the case and the main frame are arranged in a first direction intersecting the gravity direction,
- the medium is conveyed by the conveyance unit so as to pass between the case and the main frame,
- the main frame and the sub frame are arranged in a second direction different from the first direction intersecting the gravity direction and the first direction,
- an intake port is open at the main frame,
- a ventilation port in communication with the intake port and an air drawing port in communication with outside of the sub frame are open at the sub frame,
- the blower is attached to at least one of the main frame and the sub frame,
- the blower blows air into the main frame through the intake port, the ventilation port, and the air drawing port,
- the air drawing port is located at a position not overlapping the heating unit in the second direction,
- a contact portion is configured to contact the medium at a position downstream of the heating unit in the gravity direction,
- the conveyance unit is located at a position upstream of the heating unit in the gravity direction, and
- the heating unit is configured to heat the medium that is bridged between the conveyance unit and the contact portion and is conveyed in the air in the gravity direction.

2. The medium heating apparatus according to claim 1, wherein the sub frame does not overlap the heating unit in the second direction.

3. The medium heating apparatus according to claim 1, wherein the blower is located at the intake port.

4. The medium heating apparatus according to claim 1, wherein
- the heating unit is located on a front side of the main frame, and
- the air drawing port is open at a front surface of the sub frame.

5. The medium heating apparatus according to claim 1, wherein the sub frame includes a duct in communication with the ventilation port and the air drawing port.

6. The medium heating apparatus according to claim 1, further comprising a partition member configured to partition a region into a region located on a lower side of the main frame and a region located on a lower side of the sub frame as viewed from the first direction.

7. A recording apparatus comprising:
- a recording unit configured to record an image on a medium by ejecting liquid to the medium;
- a conveyance unit configured to convey the medium in a gravity direction;
- a heating unit configured to heat the medium on which liquid was ejected and which is conveyed in the gravity direction by the conveyance unit;
- a control unit configured to control the heating unit;
- a main frame configured to house the control unit;
- a sub frame attached to the main frame; and
- an air blower configured to blow air to the control unit, wherein
- the heating unit includes:
- a heat source configured to generate heat, a jetting unit configured to jet air to the medium such that the air flows downward in the gravity direction along the medium, and a case configured to house the heat source and the jetting unit, the case is provided as a separate body from the main frame, the case and the main frame are arranged in a first direction intersecting the gravity direction, the medium is conveyed by the conveyance unit so as to pass between the case and the frame, the main frame and the sub frame are arranged in a second direction different from the first direction intersecting the gravity direction and the first direction, an intake port is open at the main frame, a ventilation port in communication with the intake port and an air drawing port in communication with outside of the sub frame are open at the sub frame, the blower is attached to at least one of the main frame and the sub frame, the blower blows air into the main frame through the intake port, the ventilation port, and the air drawing port, and the air drawing port is located at a position not overlapping the heating unit in the second direction, a contact portion is configured to contact the medium at a position downstream of the heating unit in the gravity direction, the conveyance unit is located at a position upstream of the heating unit in the gravity direction, and the heating unit is configured to heat the medium that is bridged between the conveyance unit and the contact portion and is conveyed in the air in the gravity direction.

8. The medium heating apparatus according to claim 1, further comprising a heat shielding member disposed between the heating unit and the main frame and configured to shield heat from the heating unit to the main frame.

* * * * *